United States Patent
Stephenson et al.

(10) Patent No.: US 9,298,174 B2
(45) Date of Patent: Mar. 29, 2016

(54) DETERMINING TOTAL INVENTORY OF BATCH AND CONTINUOUS INVENTORIES IN A BIOFUEL PRODUCTION PROCESS

(75) Inventors: Brian K. Stephenson, Georgetown, TX (US); Patrick D. Noll, Richardson, TX (US); Maina A. Macharia, Round Rock, TX (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 1867 days.

(21) Appl. No.: 12/052,117

(22) Filed: Mar. 20, 2008

(65) Prior Publication Data

US 2009/0240603 A1    Sep. 24, 2009

(51) Int. Cl.
| | |
|---|---|
| *G06Q 10/00* | (2012.01) |
| *G05B 15/02* | (2006.01) |
| *G05B 19/418* | (2006.01) |
| *G06Q 10/08* | (2012.01) |

(52) U.S. Cl.
CPC .......... *G05B 15/02* (2013.01); *G05B 19/41865* (2013.01); *G06Q 10/087* (2013.01); *G05B 2219/32077* (2013.01)

(58) Field of Classification Search
CPC ................................. G10L 7/04; G10L 8/00
USPC .................... 703/12; 705/26, 28, 31; 435/170
See application file for complete search history.

(56) References Cited

U.S. PATENT DOCUMENTS

| | | | |
|---|---|---|---|
| 3,379,421 | A | 4/1968 | Putman |
| 6,496,781 | B1 | 12/2002 | Chen et al. |
| 2004/0033457 | A1 | 2/2004 | Zhang et al. |
| 2007/0078530 | A1 | 4/2007 | Blevins et al. |
| 2008/0028675 | A1* | 2/2008 | Clifford et al. ................. 44/605 |
| 2008/0103747 | A1 | 5/2008 | Macharia et al. |
| 2008/0103748 | A1* | 5/2008 | Axelrud et al. ................. 703/12 |
| 2008/0104003 | A1 | 5/2008 | Macharia et al. |

(Continued)

FOREIGN PATENT DOCUMENTS

EP    0303345 A2    2/1989

OTHER PUBLICATIONS

U.S. Appl. No. 12/165,371, filed Jun. 30, 2008, Macharia et al.

(Continued)

*Primary Examiner* — Robert R Niquette
*Assistant Examiner* — Rokib Masud
(74) *Attorney, Agent, or Firm* — Fletcher Yoder P.C.

(57) ABSTRACT

System and method for determining total inventory of batch and continuous biomass inventories in a biofuel production process. Measured biomass inventory values are received, including batch inventories from multiple batch fermenters and at least one continuous beer well inventory. The values are premised on a controlled vapor pressure of the batch fermenters and beer well(s), where the pressure fluctuates in an uncontrolled manner. A measured vapor pressure for the batch fermenters and beerwell(s) is received, and pressure compensated inventory values determined based on the measured inventory and pressure values. Measured biomass input flow to the batch fermenters and output flow from the beerwell(s) are received, and are premised on a constant biomass temperature and density, where biomass temperature and density fluctuate in an uncontrolled manner. The total inventory of batch and continuous inventories is determined based on the measured flows and the pressure compensated inventory values, and stored.

22 Claims, 5 Drawing Sheets

(56) References Cited

U.S. PATENT DOCUMENTS

| | | |
|---|---|---|
| 2008/0108048 A1 | 5/2008 | Bartee et al. |
| 2008/0109100 A1 | 5/2008 | Macharia et al. |
| 2008/0109200 A1 | 5/2008 | Bartee et al. |
| 2008/0167852 A1 | 7/2008 | Bartee et al. |

OTHER PUBLICATIONS

U.S. Appl. No. 12/242,531, filed Sep. 30, 2008, Macharia et al.
U.S. Appl. No. 12/242,568, filed Sep. 30, 2008, Macharia et al.
U.S. Appl. No. 12/242,606, filed Sep. 30, 2008, Macharia et al.
U.S. Appl. No. 12/242,635, filed Sep. 30, 2008, Macharia et al.

* cited by examiner

DETERMINING TOTAL INVENTORY OF BATCH AND CONTINUOUS INVENTORIES IN A BIOFUEL PRODUCTION PROCESS

FIELD OF THE INVENTION

The present invention generally relates to the field of biofuel production. More particularly, the present invention relates to systems and methods for determining total fermentation biomass inventory of batch and continuous inventories in a biofuel production process.

DESCRIPTION OF THE RELATED ART

Biofuel Production Plant

An exemplary high-level design of a biofuel production plant or process is shown in FIG. 1, which illustrates how biomass is processed through several stages to produce biofuel and one or more co-products. As may be seen, first, biomass is provided to a milling and cooking process, where biomass is broken down to increase the surface area to volume ratio. This increase in surface area allows for sufficient interaction of the fresh water (FW) and biomass surface area to achieve a solution of fermentable sugars in water. The mixture, a biomass/water slurry, may then be cooked to promote an increase in the amount of biomass-water contact in solution and to increase the separation of carbohydrate biomass from the non-carbohydrate biomass. As FIG. 1 indicates, the milling/cooking process is generally a continuous process, where biomass is continually processed through the various milling and cooking sub-processes.

The output of the milling and cooking units (i.e., the fermentation feed or slurry) is then sent to a fermentation process, where one or more fermentation units (vats) operate to ferment the biomass/water slurry produced by the milling and cooking process. The fermentation process may or may not require addition of additional fresh water to the process to control the consistency of material to the batch fermentation units (also referred to herein as fermenters). In the fermentation units, biomass is converted by yeast and enzymes into a biofuel, and by-products such as carbon-dioxide, water and non-fermentable bio-mass (solids). As fermentation proceeds, more sugar in the fermentation mash or slurry is converted into biofuel.

The output from the fermentation process is sent to a distillation process, e.g., one or more distillation units, to separate biofuel from water, carbon dioxide, and non-fermentable solids. If the biofuel has to be dehydrated to moisture levels less than 5% by volume, the bio-fuel can be processed through a processing unit called a molecular sieve. The finalized biofuel is then processed to ensure it is denatured and not used for human-consumption.

The distillation units separate the biofuel from water. Stillage (non-fermentable solids and yeast residue), the heaviest output of the distillation units, is sent to stillage processing for further development of co-products from the biofuel production process.

Stillage processing units separate additional water from the cake solids and may recycle this water back to the milling and cooking units.

As may be seen, the actual fermentation process is a batch process, where one or more fermentation vats, referred to as fermenters, are operated (e.g., in parallel) to ferment successive batches of biomass/water slurry to generate biofuel. The batch fermentation (including, for example, fermentation cycle time and solids concentration) is typically adjusted to operate the entire plant, possibly subject to one or more active process constraints. Other processes of the biofuel production process, i.e., sub-processes, are continuous processes, i.e., are processes in which a substantially continuous stream of material is processed or operated on, with substantially continuous input and output of the process. Examples of continuous (sub-)processes in the biofuel production process include, but are not limited to, cooking and milling, distillation and dehydration, and stillage processes. Note that the beerwell provides fermented biomass to the distillation/dehydration and stillage processes, which are continuous, and so while input to the beerwell from the fermenters is a batch process, the output from the beerwell is generally a continuous one. Thus, the beerwell may act as a kind of material flow buffer, allowing the batch fermentation process to integrate smoothly with the continuous distillation/dehydration and stillage processes.

It is important in biofuel production that the beerwell neither overflow, which could cause substantial damage and cleanup costs and effort, nor be drained empty, which could also cause substantial equipment damage, e.g., causing pumps to dry-spin and overheat, etc. Total fermentation biomass inventory, which is the total amount of biomass in the fermentation vats and beerwell (or more specifically, in the filling, draining and fermenting fermentation vessels and key auxiliary equipment), is generally carefully managed to insure that a) when a fermenter is emptied into the beerwell, there is enough capacity to accept the material transfer without over overflow, and b) as material from the beerwell is output (e.g., to the distillation/dehydration and stillage processes), the beerwell is never fully emptied.

Note that if the batch times are decreased, not only does the product rate to distillation increase, since the fermentation product is available sooner and thus more often, but the fermentation feed rates must be increased to ensure batches are filled on time in keeping with the processing sequence. Conversely, if the batch times are increased, not only does the product rate to the distillation process decrease, but the fermentation feed rates must be slowed to match fermentation times. Thus the batch and continuous processes are operationally linked and must generally be controlled in an integrated manner.

As noted above, fermentation inventory, which is a totalized inventory across the filling, draining and fermenting fermentation vessels and key auxiliary equipment, must generally be monitored for managing biomass fermentation. If this total inventory level is controlled or held within an acceptably stable band, the front plant section, i.e., the cooking/milling, and fermentation processes, can be managed to match the back plant section, i.e., the beerwell and distillation and stillage processes, across all batch sequentially operated fermentation vessels. If totalized batch volume is controlled properly, then filling may be balanced with draining across multiple parallel batch fermentation vessels to avoid beerwell overage or underage.

However, in many biofuel plants, level sensors used to determine fermentation tank and beerwell levels are based only on pressure, where, for example, the sensor is located at the bottom of the vessel, and calibrated for the vessel's particular geometry to indicate a level value based on the pressure, which, since pressure is generally proportional to depth, provides a measure of biomass volume or amount in the vessel. Thus, these pressure-based sensors generate data that are premised on a controlled vapor space pressure of the batch fermenters and the at least one beer well. However, there are phenomena, e.g., disruptions or disturbances, that occur in the process that may cause these sensors to indicate inaccurate values. For example, each of these vessels (fermentation tanks and beerwell) generally has space at the top of the vessel that holds gas, e.g., carbon dioxide from the fermentation process. This gas can contribute to the pressure measured by the level sensor and thus lead to erroneous level values.

As another, more extreme, example, once a fermenter has completed fermenting a batch, the fermented biomass is transferred to the beerwell. This transfer happens relatively quickly, e.g., over 1-3 hours, and generally results in substantial fluctuations in pressure, e.g., from rapid changes in the gas volume in the fermenter and beerwell, and possibly even turbulence in the biomass flow. In other words, during the transfer process, the pressure (the actual pressure) of the vessels tends to fluctuate in an uncontrolled manner, leading to corresponding erroneous level measurements by the level sensors. Thus, uncontrolled influences may be sources of error for level sensors premised on controlled pressure of batch fermenters and beerwells. Thus, the fact that both batch and continuous inventories contribute to total biomass inventory may introduce errors and complications in tracking total inventory.

Similarly, biomass flow sensors may also operate under assumptions that do not hold in the biofuel process, and particularly the fermentation process. For example, biomass flow sensors in many prior art biofuel production processes are premised on a constant biomass temperature and density, even though actual biomass temperature and density may fluctuate in an uncontrolled manner during the process. For example, as the biomass ferments in the fermenters, constituents of the biomass may change, resulting in a change in density. As another example, since fermentation is generally an exothermic process, the temperature may also change during the fermentation process. Thus, uncontrolled influences in the fermentation process (including beerwell operations) may introduce errors in biomass flow measurements made by flow sensors premised on constant biomass temperature and density.

Re-instrumenting these biofuel plants with compensating sensors, e.g., pressure-compensating, temperature-compensating, and/or density-compensating, sensors may not be a feasible option, e.g., due to the high cost of retrofitting, unacceptable down-time for the production facility, and so forth.

Because of these uncontrolled influences, primarily due to the inclusion of batch and continuous biomass inventories, prior art biofuel production processes are generally operated very conservatively, e.g., maintaining large safety margins with respect to biomass levels in the fermenters and beerwell, which results in sub-optimal production rates, since vessels must be operated significantly below maximum or optimum capacity.

Thus, improved systems and methods for determining total inventory of batch and continuous inventories in a biofuel production process are desired.

SUMMARY OF THE INVENTION

Various embodiments of a system and method for determining a total inventory of batch and continuous inventories in a biofuel production process are presented.

Measured biomass inventory values may be received, including a plurality of fermentation batch inventories of a corresponding plurality of batch fermenters and at least one continuous beer well inventory from a corresponding at least one beer well that receives fermented biomass from the plurality of fermenters. The measured biomass inventory values may be premised on a controlled vapor space pressure of the batch fermenters and the at least one beer well, where the vapor space pressure fluctuates in an uncontrolled manner.

At least one measured vapor space pressure for the batch fermenters and the at least one beer well may be received, and pressure compensated measured biomass inventory values determined based on the measured biomass inventory values and the at least one measured vapor space pressure. Measured values of biomass input flow to the batch fermenters and biomass output flow from the at least one beer well over a specified time period may be received. The measured values of biomass input flow and biomass output flow may be premised on a constant biomass temperature and density, where biomass temperature and density fluctuate in an uncontrolled manner.

A net measured biomass flow over the specified time period may be determined based on the measured values of biomass input flow and biomass output flow. The total inventory of batch and continuous inventories may then be determined based on the net measured biomass flow and the pressure compensated measured biomass inventory values, where the total inventory of batch and continuous inventories is or includes a normalized weighted sum of the net measured biomass flow and the pressure compensated measured biomass inventory values. Finally, the determined total inventory of batch and continuous inventories may be stored, where the total inventory is useable to control biomass inventory in the biofuel production process.

Thus, various embodiments of the systems and methods described herein may be used to determine total inventory of batch and continuous inventories in a biofuel production process.

BRIEF DESCRIPTION OF THE DRAWINGS

A better understanding of the present invention can be obtained when the following detailed description of the preferred embodiment is considered in conjunction with the following drawings, in which.

Figure 1:
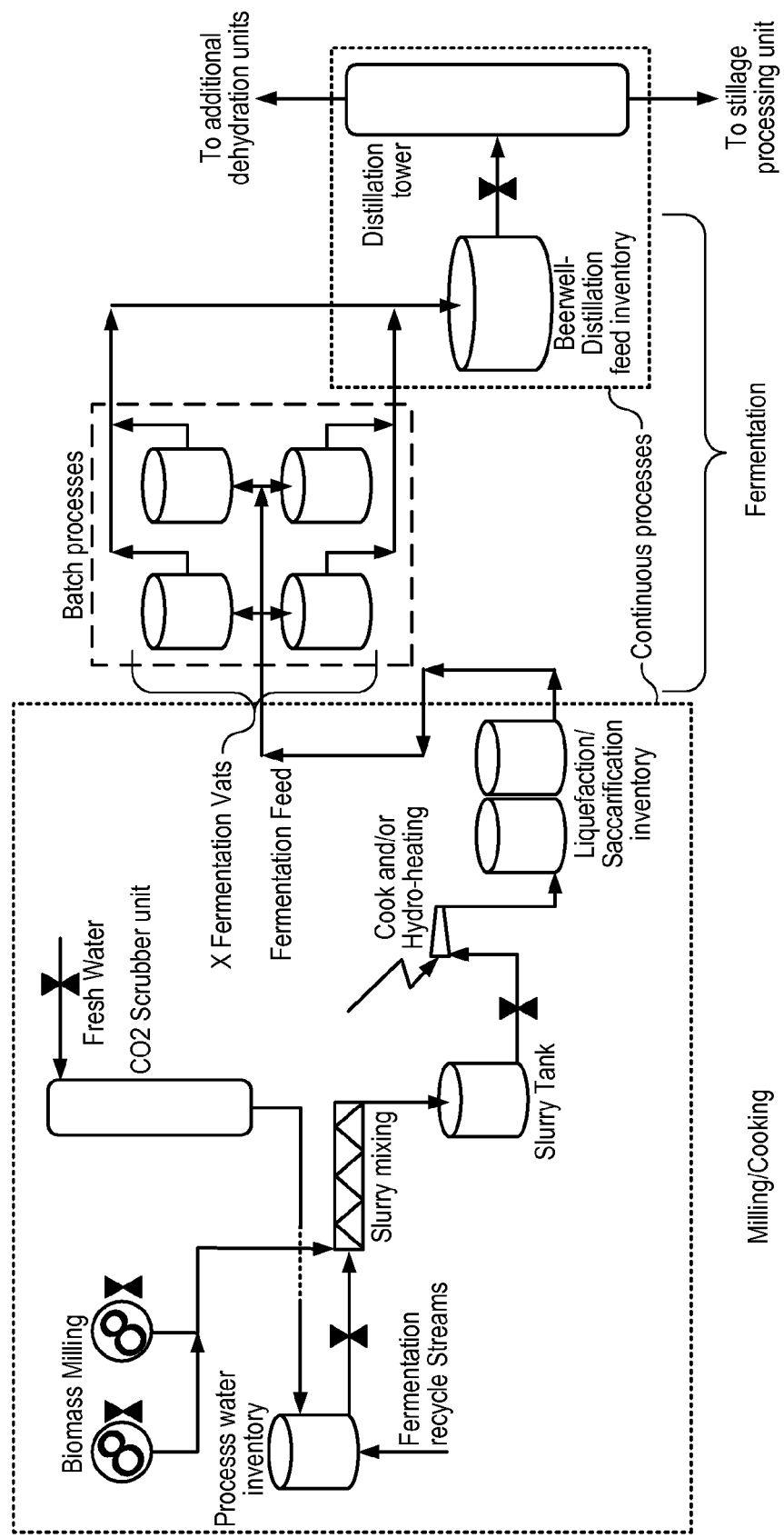
FIG. 1 illustrates batch and continuous processes in an exemplary biofuel processing plant, according to the prior art.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF THE INVENTION

Incorporation by Reference

The following references are hereby incorporated by reference in their entirety as though fully and completely set forth herein:

U.S. patent application Ser. No. 11/757,557, titled "Model Predictive Control of a Fermentation Feed in Biofuel Production", filed Jun. 4, 2007.

U.S. patent application Ser. No. 11/862,391, titled "Model Predictive Control of Distillation and Dehydration Sub-Processes in a Biofuel Production Process", filed Sep. 27, 2007.

U.S. patent application Ser. No. 11/924,370, titled "Model Predictive Control of Integrated Stillage Processing in a Biofuel Production Process", filed Oct. 25, 2007.

U.S. patent application Ser. No. 11/928,186, titled "Integrated Model Predictive Control of Batch and Continuous Processes in a Biofuel Production Process", filed Oct. 30, 2007.

U.S. patent application Ser. No. 11/927,889, titled "Model Predictive Control of Fermentation in Biofuel Production", filed Oct. 30, 2007.

U.S. patent application Ser. No. 11/927,960, titled "Nonlinear Model Predictive Control of a Biofuel Fermentation Process", filed Oct. 30, 2007.

U.S. patent application Ser. No. 11/928,344, titled "Model Predictive Control of Fermentation Temperature in Biofuel Production", filed Oct. 30, 2007.

DEFINITIONS

Biofuel Production Processes

Biofuel—any fuel (or fuels) derived from biomass, i.e., from recently living organisms or their bi-products.

Biofuel production process—a fermentation process surrounded by auxiliary processing units to produce biofuel, other fermentable alcohols for fuel, and high-capacity food grade or chemical grade alcohols.

Biofuel production—a measure of biofuel production within or at the end of a batch process. May include measurements such as concentration (e.g., wt %, volume % or wt/vol %), volume (e.g., current gallons biofuel within a fermenter) or mass (e.g., current kg biofuel within a fermenter).

Batch processing—a staged discontinuous processing step that includes a start and an end, in contrast to continuous processing that continues without stop, e.g., during a normal operating day or week. Continuous processing is generally represented by fairly steady targets or operations, where at least some parameters change throughout batch processing. For example, biofuel production, e.g., fermentation, starts at low levels at the start of a batch and increases throughout the batch with or without a drop at the end representing degradation rates being higher than production rates. Similarly, yeast cellular concentrations, start at fairly low levels, and generally grow throughout a batch, although they generally have a lag (relatively constant concentrations), exponential growth, stable growth and degradation phase within a batch.

Slurry—a fermentation feed mash comprising a two-phase (liquid and solid) slurry that will be fermented.

Solids or % solids—fraction or percent of solids in the fermentation feed.

Milling and cooking Process—continuous processing for pre-fermentation of the fermentation feed, which generally includes grain or cane milling, cooking, mixing with water and processing chemicals, cooking for sterilization and increasing water concentration within solids, and other pre-fermentation processing.

Biomass concentration—content attribute of the fermentation feed specified by one or more of: slurry solids, liquefaction solids, slurry density, liquefaction density, slurry % or fraction carbohydrates, and slurry % or fraction fermentable sugar.

Water inventory information—includes water flows, recycle liquid flows, evaporator condensate recycle flow, thin stillage or centrifuge liquor recycle flows, fresh water addition flows, processed water addition flows, slurry flows, mash flows, and various levels or weights for various tanks used to hold inventories of these flows or for intermediate receptacles (e.g. methanator feed tank, slurry feed tank, liquefaction tank, distillate tank, grain silo inventories or other biomass inventories (not water) etc.).

Liquefaction—for grains with high starch content, the starch is liquefied to reduce its carbohydrate chain length and viscosity by adding enzymes or other biologic agents.

Thermal Oxidizer/Heat Recovery Steam Generator (HRSG)—process equipment that is used to destroy volatile organic compounds (VOCs), to reduce air and remove stenches from stillage dryer or evaporation systems. The heat recovery steam generator is used to recover the heat required to destroy the VOCs, and is typically the energy center of the biofuels production process.

Dried Distillers Grains (DDG)—post fermentation solid residue that includes undigested grain residue, other solid residues (enzymes, salts), and yeasts (or other cellular residue) that may be dried and released as a production by-product (generally as animal feed). DDG may also be used herein to include WDG (wet distillers grains), which are only partially dried for local consumption (e.g. without long-term biological stability) and DDGS/WDGS (dried distillers grains with solubles and wet distillers grains with solubles). Solubles includes residue solids that are soluble in water and therefore present in stillage concentrate. Solubles may be partially concentrated (generally with evaporation), and added to DDG or WDG to increase yields and manage by-product inventories.

Enzyme—highly selective biological-based catalyst added to manage specific reactions within a fermentation process. The most common enzymes used today include alpha amylase to rapidly break starches into dextrins, gluco-amylase to break dextrins into glucose, and proteases to break grain proteins into digestible proteins to support cell growth. In the same way as described below, modeling and controlling starch-based fermentations, enzymes specific for cellulosic conversion into biofuels or other enzymes affecting yeast (see below), growth or nutrient availability may be managed.

Yeast—a biofuel producing organism. Yeasts are currently the most commonly used organism in ethanol production although other biofuel producing organisms including genetically engineered *E. coli* can be substituted throughout as the technology described may not be specific to yeast, and may apply to many organisms used in fermentation processes to produce biofuel.

Stillage/Whole Stillage—non-fermentable solids and water liquid removed from the bottom of the primary distillation units.

Thin Stillage—the separated liquid from the stillage non-fermentable solids.

Syrup—concentrated thin-stillage with a large portion of the moisture removed. The % solids in syrup are usually in the range of 20-45% solids, but percentages outside this range may occur.

Azeotrope—a special mixture of two compounds, that when in equilibrium, the vapor phase and liquid phase have exactly the same compositions. This makes it difficult to separate the two components to achieve a better purity. Special separation processes are required to break the azeotrop. They comprise azeotropic distillation (add a $3^{rd}$ compound to break the azeotrop), extractive distillation (use a solvent to separate the 2 compounds), or molecular sieve technology (preferentially trap molecules of one component in a molecular sieve bed as the other component passes over the molecular sieve bed).

Volatile Organic Compounds (VOCS)—Organic compounds that tend to vaporize when subject to atmospheric pressure and ambient temperature ranges.

Capacity—capacity is the established maximum production rate of the process, sub-process, or unit under best operating conditions (no abnormal constraints). Capacity is generally a constant within the present capital investment. For new units it is the vendor's specified capacity. For established units, capacity is established by demonstrated historical production rates.

Model—an input/output representation, which represents the relationships between changes in various model inputs and how the model inputs affect each of the model outputs.

Dynamic Predictive Model—an input/output representation of a system or process that not only reflects how much an output changes when an input is changed, but with what velocity and over what time-dependent curve an output will change based on one or more input variable changes. A dynamic multivariate predictive model is a dynamic predictive model that represents or encodes relationships among multiple parameters, and is operable to receive multiple inputs, and generate multiple outputs.

Model Predictive Control (or MPC)—use of multivariate dynamic process models to relate controller objectives (targeted controller outputs and constraints) with regulatory controllers (existing single-input/single-output controllers such as ratio flow, temperature, level, speed, or pressure controllers) over a predicted time interval (e.g., 1 minute, 30 minutes, 2 hours, 100 hours, etc.).

Objective Function—sets the goals for the overall operation of the process or unit. The objective function provides one or several consistent numerical metric(s) to which the process or unit strives to achieve and over which the performance of the process or unit may be measured, e.g., minimize the cost of operation, or maximize profit or production of the operation.

Control Variables—(also called controlled variables) those variables that the controller/optimizer tries to bring to some objective, e.g., to a target value, maximum, etc.

Integrated Variables—integrated control variables are variables that are not stable, but integrate generally with a stable first derivative as a function of time. The most common integrated variable is a tank level where as long as inputs and outputs are imbalanced the level will increase or decrease. Thus, when balanced a change in an input or output flow will cause a tank to either overfill or drain as integrated over time. A controller must use these integration calculations to determine when and how rapidly input or output flows must be adjusted.

Manipulated Variables—those variables over which the management of the process or unit has authority and control, e.g., via regulation of the process with online controllers, and which are changed or manipulated by the controller/optimizer to achieve the targets or goals of the control variables. These variables are the actual control variables whose values are limited by the constraints. This is in distinction from controllable constraints in the sense that manipulated variables may operate within some range of controllable or fixed constraints. Manage is an alternate term for process control.

Disturbance Variable—a variable representing an external influence on a process that, in addition to objective variables and regulatory controllers, is outside the controller scope, and so it acts on the objective variables, but independently of the described controller. Disturbance variables are used in feed-forward disturbance rejection. Disturbance variables are also measured or unmeasured variables over which the management of the process or unit does not have direct authority or control. For example, temperature, humidity, upstream flow, or quality, may all be referred to as measured disturbance variables.

Set Point (targets)—the target signal or value for a manipulated variable or targeted controlled variable.

Constraints—Constraints represent limitations on particular operating variables or conditions that affect the achievable production rate of a production unit. Constraints are of two types: controllable and external, defined below. Constraints may include, but are not limited to: safety constraints, equipment constraints, equipment availability constraints, personnel constraints, business execution constraints, control constraints, supply chain constraints, environmental permit and legal constraints. Safety constraints ensure the safety of equipment and personnel. Equipment constraints, such as the maximum open position of a control valve, maximum tank capacity, etc., may limit the physical throughput of the unit. Equipment availability constraints may include, but are not limited to: readiness due to maintenance planning and scheduling, or due to unexpected equipment outages, authorized production level set by the supply chain and production scheduling systems. Personnel constraints refer to limitations on the availability of staffing and support functions, business rules and constraints imposed by contract and policy. Business execution constraints are limits imposed by the time required to execute associated business and contractual tasks and obligations. Control constraints are limits on the maximal position and rate of change of manipulated variables. Supply chain constraints are limits on the availability of raw materials, energy, and production supplies. Environmental permit and legal constraints are limits on air emissions, waste water, and waste disposal systems, and/or environmental constraints imposed upon the performance of the unit, such as river levels and current weather imposed limitations.

Controllable Constraints—constraints imposed on the performance of a process or unit over which the management of the process or unit does have authority and discretionary control. For example, the separation in a distillation tower may be affected by distillation tray fouling. The tray fouling is a function of how the feed-stock is processed, and how often the unit is taken offline for clean-up. It is management's discretion as to when the unit is serviced. Controllable constraints change a unit's throughput capacity.

External Constraints—external constraints are limitations imposed on the performance of the process, sub-process, or unit over which the management of the process, sub-process, or unit does not have authority or discretionary control. These external constraints come in two types: external constraints that are controllable by other entities or processes in the plant or in the supply chain, and those constraints that are imposed by physical, safety, environmental, or legal constraints and are not controllable by anyone in the plant or supply chain.

System—a system may be defined by the inputs and the characteristics of the system or process. In the biofuel production process, the system may be defined for: the entire biofuel production process, a sub-process of the biofuel production process such as the milling and cooking process, or a variable in a sub-process such as the cooking temperature.

Open Loop Systems—are systems that respond to an input, but the system is not modified because of the behavior of the output. For example, in a biofuel system, a reciprocating pump will operate and move at a fixed volume of syrup independent of the upstream and downstream pressure if the reciprocating pump does not have a pressure control system.

Closed Loop Systems—system inputs may be adjusted to compensate for changes in the output. These changes may be a deviation from an objective for the system, impacts of constraints on the system or system variables, or measurements of output variables. The closed loop system may be used to sense the change and feedback the signal to the process input. In biofuel systems, closed loop systems may predominate, since these systems may be regulated subject to constraints such as production (product) quality, energy costs, process unit capacity, etc.

Control System—the regulatory level mechanism by which the manipulated variables are driven to the set points.

Response—the measurement of the current position of the manipulated variable. The response is the feedback of the movement of the manipulated variable to the set point in response to the actions of the control system in its effort to achieve the set point.

Target Profile—a desired profile or trajectory of variable values, i.e., a desired behavior of a control variable or a manipulated variable.

Control Horizon—the period of the time extending from the present into the future during which one plans to move or change manipulated variables. Beyond this horizon the MV is assumed to stay constant at its last or most recent value in the control horizon.

Prediction Horizon—the period of time extending from the present into the future during which the process or system response is monitored and compared to a desired behavior.

Determination of Total Fermentation Biomass Inventory in a Biofuel Production Process Below are described various embodiments of systems and methods for determining total fermentation biomass inventory in a biofuel production process, particularly where level and biomass flow sensors are premised on controlled conditions, where the actual conditions fluctuate in an uncontrolled manner. It should be noted that the biofuel or biofuels produced by embodiments of the methods described herein may be any of biofuel generated from biomass, and that the types of biomass contemplated may be of any type desired, including, but not limited to, grains, such as corn, wheat, rye, rice, etc., vegetables, e.g., potatoes, beats, etc., canes, such as sugarcane, and sorghum, and even grasses, e.g., switchgrass, and so forth, among others. Moreover, the techniques discloses herein may also be applicable to other bulk material processing, e.g., production of polymers, bulk foodstuffs, petroleum processing and production, and so forth.

In embodiments of the systems and methods described below, information regarding biomass inventory may be received or derived via multiple approaches, and used together to generate inventory information that is more accurate than that provided by any of the approaches alone.

A detailed description of this method is now described with reference to FIG. 2.

Figure 2:
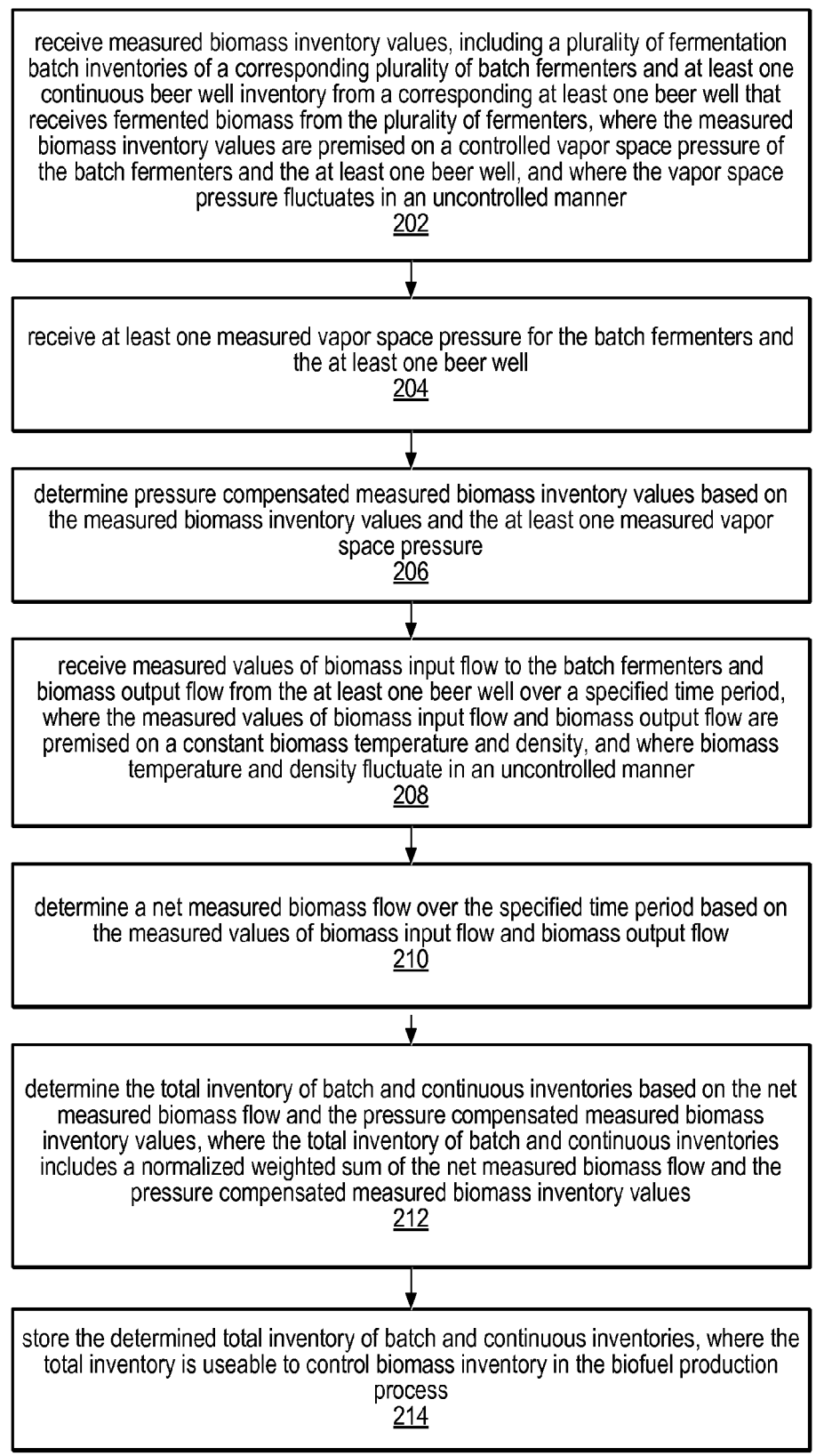
FIG. 2 is a high-level flowchart of a method for determining total fermentation biomass inventory in a biofuel production process, according to one embodiment.

FIG. 2—Method for Determining Total Fermentation Biomass Inventory

FIG. 2 is a flowchart of a computer-implemented method for determining total fermentation biomass inventory in a biofuel production process, according to one embodiment. In various embodiments, some of the method elements shown may be performed concurrently, in a different order than shown, or may be omitted. Additional method elements may also be performed as desired. As shown, this method may operate as follows.

In 202, measured biomass inventory values may be received, including a plurality of fermentation batch inventories of a corresponding plurality of batch fermenters and at least one continuous beer well inventory from a corresponding at least one beer well that receives fermented biomass from the plurality of fermenters. The measured biomass inventory values may be premised on a controlled vapor space pressure of the batch fermenters and the at least one beer well, where the vapor space pressure fluctuates in an uncontrolled manner. For example, the measured biomass inventory values may be provided by level sensors that are not pressure-compensated, and thus are subject to uncontrolled pressure fluctuations that introduce errors or noise into the measured values. Note that the level sensors may provide raw level data that is converted to volume or mass amounts (based on the known geometry of the vessels), or may be configured provide volume or mass measurement directly.

Figure 3:
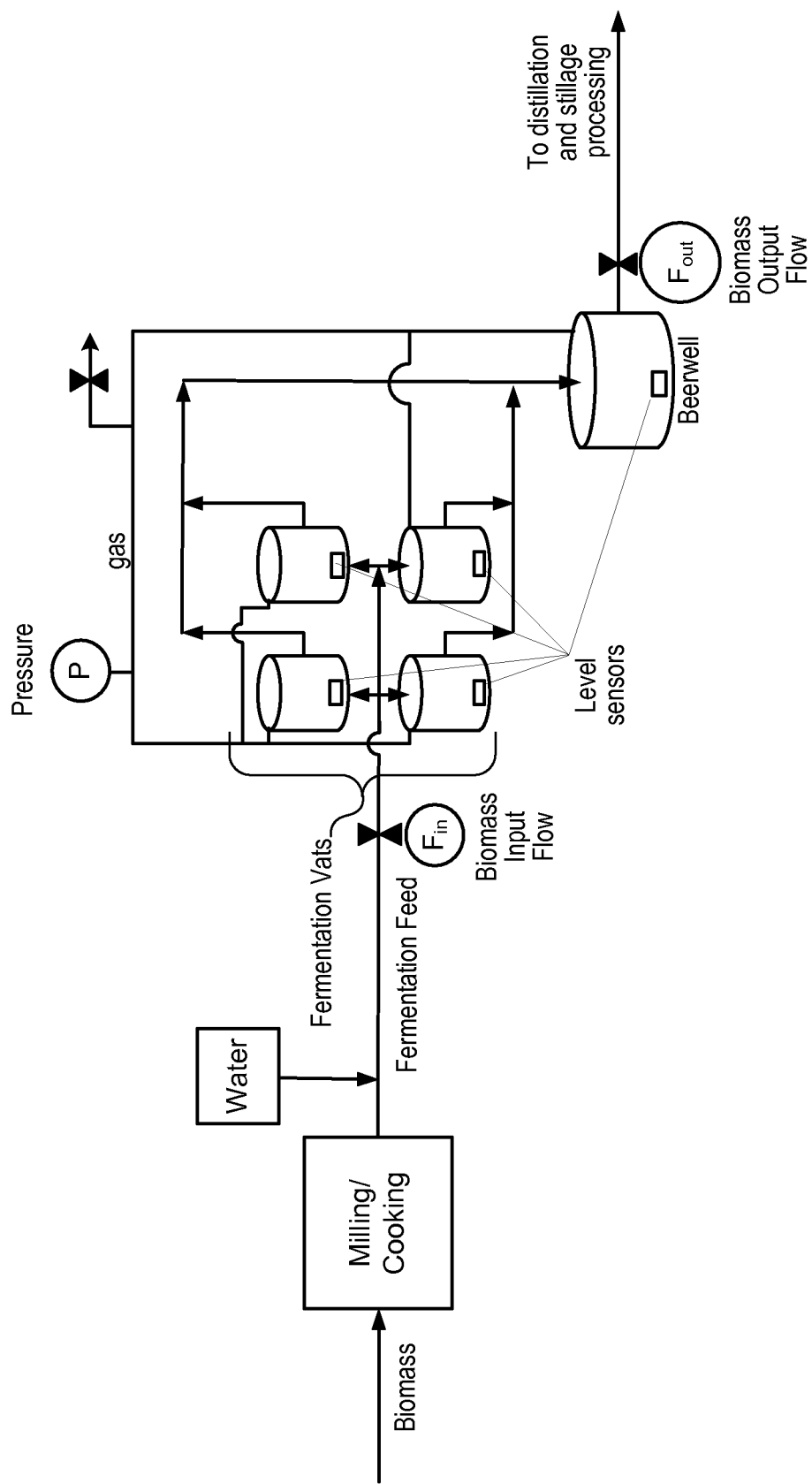
FIG. 3 illustrates instrumentation of fermentation processes in a biofuel production process, according to one embodiment.

FIG. 3 is a high-level diagram of an exemplary biofuel production plant, according to one embodiment. The biofuel production plant of FIG. 3 may include or be included in a system configured to implement embodiments of the present invention, as will be discussed in more detail below. As FIG. 3 shows, biomass, e.g., grain, cane, grass, etc., may be processed by milling and cooking processes, which provides the resulting biomass slurry or fermentation feed to a plurality of batch fermenters, e.g., fermentation vats, in this exemplary case, four fermenters, although in other embodiments, any number of fermenters may be used as desired. As noted above, the fermenters operate in a staged manner, and provide respective batches of fermented biomass to the at least one beerwell, which then provides the fermentation biomass to distillation/dehydration and stillage processes in a substantially continuous manner.

As also indicated in FIG. 3, the fermentation process may be instrumented to provide information regarding biomass inventory for the fermentation process, including the beerwell. In one embodiment, a plurality of level sensors may be employed to provide fermentation biomass level information. For example, as may be seen, in this exemplary embodiment, level sensors may be located in each fermenter (e.g., vat), as well as in the beerwell. The level indicators may not be pressure-compensated, and so may be subject to errors due to uncontrolled pressure fluctuations, as discussed above. Thus, the plurality of level sensors may include a first plurality of level sensors coupled to a respective first plurality of batch fermenters and configured to measure respective fermentation batch inventories of the batch fermenters, and at least one level sensor coupled to a respective at least one beer well, and configured to measure beer well inventory. As mentioned above, the plurality of level sensors may operate under an assumption of controlled vapor space pressure of the batch fermenters and the at least one beer well, wherein the vapor space pressure fluctuates in an uncontrolled manner In 204, at least one measured vapor space pressure (value) for the batch fermenters and the at least one beer well may be received. For example, the at least one measured vapor space pressure may be provided by a corresponding at least one pressure sensor coupled to the batch fermenters and the at least one beer well and configured to measure vapor space pressure for the batch fermenters and the at least one beer well.

Turning again to FIG. 3, as indicated, at least one pressure sensor may be employed to detect or measure pressure in the fermentation vats and beerwell. There are numerous ways this may be accomplished. For example, in the embodiment shown, the fermentation vats and beerwell are coupled by a gas transport, e.g., a pipe, such that vapor space pressure among these vessels will tend to equilibrate rapidly, and so a single pressure sensor, labeled "P" is shown for measuring the common pressure of the vessels. In other embodiments, multiple pressure sensors may be deployed and used as desired.

Thus, one or more pressure sensors may be used to provide vapor space pressure measurements for the batch fermenters and beerwell.

In 206, pressure compensated measured biomass inventory values may be determined based on the measured biomass inventory values and the at least one measured vapor space pressure. In other words, the measured values of biomass inventory provided by the (non-pressure-compensated) level sensors may be adjusted based on the measured vapor space pressure measurements. This adjustment may improve the accuracy of the level measurements. Note that these measured (and compensated) level values may be summed to indicate a (generally noisy) value of the total inventory for the fermentation process, e.g., fermenters and beerwell(s) (and various auxiliary equipment, e.g., transfer pipes, etc.).

In 208, measured values of biomass input flow to the batch fermenters and biomass output flow from the at least one beer well over a specified time period may be received. The measured values of biomass input flow and biomass output flow may be premised on a constant biomass temperature and density, where biomass temperature and density fluctuate in an uncontrolled manner.

For example, the measured biomass input flow and output flow measurements may be provided by biomass flow sensors that are not temperature or density compensated, and thus may be subject to uncontrolled temperature or density fluctuations that introduce errors or noise into the measured values. Thus, the system, e.g., the biofuel production plant or process, may include a biomass input flow sensor coupled to the batch fermenters, and configured to measure biomass input flow to the batch fermenters, and at least one output flow sensor coupled to the at least one beer well, and configured to measure biomass output flow from the at least one beer well, where the biomass input flow sensor and the at least one biomass output flow sensor operate under an assumption of a constant biomass temperature and density, where biomass temperature and density fluctuate in an uncontrolled manner.

Turning again to FIG. 3, biomass flow sensors are shown that are configured to measure biomass input and output flows of the fermentation process. More specifically, a biomass input flow sensor, labeled "$F_i$," is shown at or near a valve regulating fermentation feed flow to the fermentation vats, and a biomass output flow sensor, labeled "$F_i$," is shown at or near a valve regulating output from the beerwell. Of course, in other embodiments, e.g., where multiple beerwells are used, multiple output flow sensors may be used as desired.

In 210, a net measured biomass flow over the specified time period may be determined based on the measured values of biomass input flow and biomass output flow. In preferred embodiments, the specified time period comprises a temporal window over which biomass flow rates may be integrated to generate a measure of total net biomass in the fermentation process over that time period. This inventory information may be generated multiple times in an iterative manner with respect to a moving time window, where a given net flow value is determined for a particular instance of the window, i.e., the specified time period mentioned above. Thus, based on mass balance considerations, another (generally noisy) value for total inventory for the fermentation process may be determined.

In some embodiments, this inventory information may be generated multiple times in an iterative manner with respect to a moving time window, where a given net flow value is determined for a particular instance of the window, i.e., the specified time period mentioned above, as will be discussed in more detail below.

Thus, per 202-206, level or volumetric measurements may be used to determine a first value for the total fermentation biomass inventory, and, per 210, a mass balance approach may also be used to determine a second value for total fermentation biomass inventory. In other words, per the above, values for total fermentation biomass inventory may be determined using two different approaches or channels of information, specifically, from level indications, and from mass balance considerations, although both values are likely to include errors or noise due to the lack of compensating sensors.

In 212, the total inventory of batch and continuous inventories may be determined based on the net measured biomass flow and the pressure compensated measured biomass inventory values. In one embodiment, the total inventory of batch and continuous inventories may be or include a normalized weighted sum of the net measured biomass flow and the pressure compensated measured biomass inventory values.

In 214, the determined total inventory of batch and continuous inventories may be stored, where the total inventory is useable to control biomass inventory in the biofuel production process.

The following is an exemplary mathematical description of the above inventory determinations, although it should be noted that in other embodiments, other formulations may be used as desired.

The level-based fermentation inventory may be represented by:

$$I_{F_L} = \text{batch inventory (}fermenters\text{)} + \text{continuous inventory(}beerwell\text{)} \quad (1)$$

or $$I_{F_L} = \sum_1^n V(L_i) + V(L_{BW}),$$

where n refers to the number of batch fermenters, and $V(L_i)$ and $V(L_{BW})$ refer to volumes (or more generally, amounts) of biomass for the batch fermenters and beerwell(s), respectively, based on level measurements.

Similarly, the mass balance-based fermentation inventory may be represented by:

$$I_{F_{MB}} = \Delta V_{accum} = \int_0^T (F_{in} - F_{out})\Delta T, \quad (2)$$

where $\Delta V_{accum}$ refers to an accumulated volume or amount of biomass over the specified time period, $F_{in}$ and $F_{out}$ refer to input and output biomass flows, respectively, in the specified time period (temporal window).

Now, as indicated above, each of these inventory values is generally noisy and/or erroneous, due to the lack of compensating sensors. However, by combining these values in a weighted sum (212 above), a resulting value may be determined that is more accurate than either constituent value alone. One example of such a weighted sum is:

$$I_T = aI_{F_L} + bI_{F_{MB}}, \quad (3)$$

where a and b are weighting coefficients that sum to 1, e.g., 0.5 and 0.5, 0.2 and 0.8, etc., and where $I_T$ refers to an adjusted total fermentation inventory. By selecting appropriate values for these coefficients, e.g., by tuning these coefficients to a particular plant, a more accurate value for total inventory may be determined.

Figure 4:
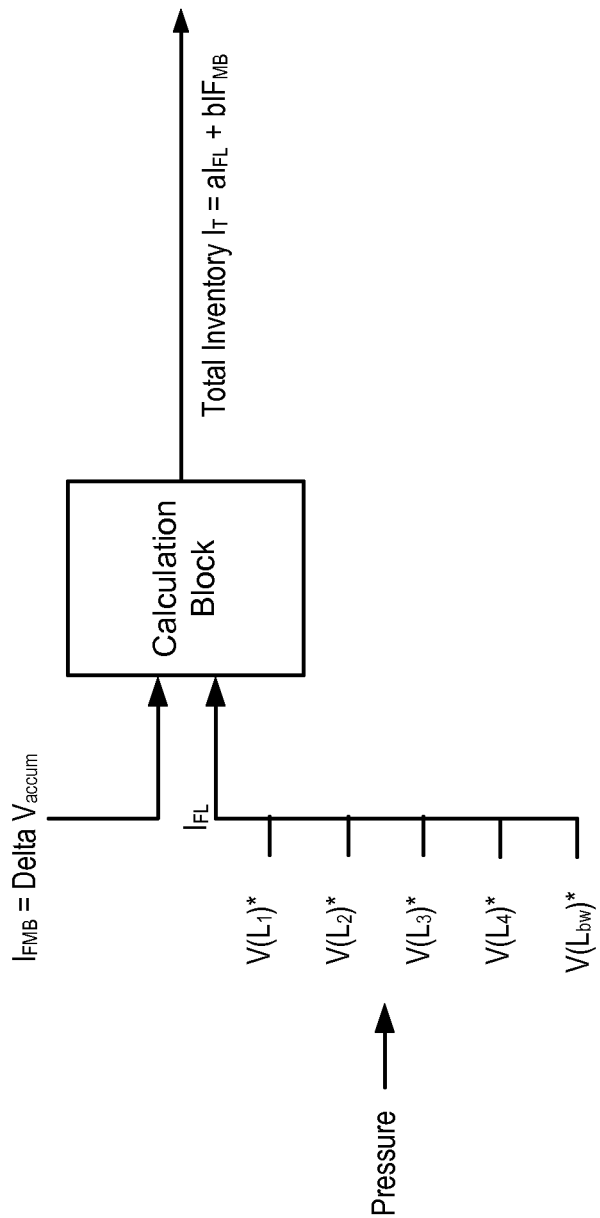
FIG. 4 illustrates a calculation block for determining total fermentation biomass inventory, according to one embodiment.

For example, in preferred embodiments, the biofuel production plant or process may include or be coupled to computing means, e.g., one or more computers or controllers with memory that stores program instructions executable by the processor to implement embodiments of the method described herein. More specifically, in one embodiment, the program instructions may implement a calculation or function block configured to receive the measured pressure and level values, and the accumulated volume, and determine the weighted sum, i.e., the determined total inventory. Such an exemplary calculation block is shown in FIG. 4, where level-based volumes ($V(L_i)$) for the batch fermenters and beerwell(s) (in this case, compensated based on the measured pressure), and the accumulated mass flow volume determined from the flow sensors, are input to the calculation block, and the total inventory output.

Note that depending on the exact form of the received data, one or more auxiliary operations may also be performed by the calculation block. For example, in some embodiments, the calculation block may receive uncompensated volume (or level) values and the pressure measurement, and may perform the compensation.

Note further that since the mass-flow-based accumulated delta volume (i.e., $I_{F_{MB}}$) is for the specified time period, T, the level-based measurements must be converted to a corresponding form. For example, the level (and pressure) measurements may include values for the beginning and end of the specified time period, and the differences computed, e.g., $V(L_i)_{t2} - V(L_i)_{t1}$ for each fermenter and beerwell, thus giving level-based inventory values for the specified time period, which may then be used in the determination of the total inventory.

Alternatively, the mass-flow-based accumulated delta volume may be converted to absolute terms, e.g., by adding the accumulated volume for the specified time period to a prior total volume value, e.g., which may be tracked from the beginning of the process, and this absolute value used with the level-based (compensated) measurements in the determination of the total inventory.

Thus, the data used to compute the total inventory assume any of a variety of forms, and the calculation block may convert or modify some or all of the input data as appropriate to determine the total inventory.

In some embodiments, the method may include determining these weighting coefficients for the normalized weighted sum of the net measured biomass flow and the pressure compensated measured biomass inventory values.

For example, in one embodiment, the coefficients may be determined as follows: historical values for the measured biomass inventories, the measured vapor space pressure, and the measured biomass input flow and biomass output flow may be received, and subsets of the historical values where the vapor space pressure, the biomass temperature, and the biomass density are controlled determined. Regression analysis may then be performed on the determined subsets of the historical values to determine the weighting coefficients.

In another embodiment, the weighting coefficients may be determined by: determining a calculated total inventory of batch and continuous inventories, and operating the biofuel production process a plurality of times using a plurality of candidate weighting coefficient values to generate a corresponding plurality of test values of determined total inventory of batch and continuous inventories. The test values and the calculated total inventory may then be analyzed to determine a test value that most closely matches the calculated total inventory, wherein the determined weighting coefficients correspond to the test value. Note that determining a calculated total inventory of batch and continuous inventories may include determining the calculated total inventory of batch and continuous inventories based on a known biomass transfer rate of a fermenter to the beer well, e.g., based on the specified behavior or design of the fermenter/beerwell transfer process/equipment.

It should be noted that the above describes but two exemplary techniques for determining the weighting coefficients, and that any other techniques may be used as desired, including statistical or random search techniques such as simulated annealing, Levy flights, and so forth, among others.

FURTHER EMBODIMENTS

The following describes various further embodiments of the systems and methods discussed above, and presents exemplary techniques and uses illustrating variations of the present invention.

For example, in one embodiment, the total inventory of batch and continuous inventories in a biofuel production process may be determined by: measuring biomass inventory values, where the measuring is premised on a controlled vapor space pressure, where actual vapor space pressure fluctuates in an uncontrolled manner; measuring at least one measured vapor space pressure; determining pressure compensated measured biomass inventory values based on the measured biomass inventory values and the at least one measured vapor space pressure; measuring values of biomass input flow and biomass output flow over a specified time period, where measuring values of biomass input flow and biomass output flow is based on a constant biomass temperature and density, where actual biomass temperature and density fluctuate in an uncontrolled manner; and determining the total inventory of batch and continuous inventories based on the pressure compensated measured biomass inventory values and the measured values of biomass input flow and biomass output flow, where the determined total inventory of batch and continuous inventories is useable to control biomass inventory in the biofuel production process.

In one embodiment, the method may include providing the determined total inventory of batch and continuous inventories to a model predictive controller as input, and the model predictive controller controlling biofuel production rates based on the determined total inventory to maintain beer well inventory between specified minimum and maximum levels during batch transfer from any of the batch fermenters to the beer well. In other words, the determined total inventory may be used as input to an automatic model-based controller that may then automatically control the biofuel production process accordingly.

In an alternate embodiment, the method may include indicating the determined total inventory of batch and continuous inventories to an operator of the biofuel production process, e.g., on a computer display of an operator workstation. The determined total inventory may then be useable by the operator to maintain beer well inventory between specified minimum and maximum levels during batch transfer from any of the batch fermenters to the beer well. In other words, the determined total inventory value may be used by a human operator to control the biofuel production process, e.g., to make decisions concerning operation of the plant.

Whether automatically or manually, the total inventory may be used to control biofuel production, specifically, fermentation inventories, e.g., to maximize or optimize production by operating the plant at or close to maximum capacity.

For example, in one embodiment, the method may include controlling biofuel production rates in the biofuel production process using the determined total inventory of batch and continuous inventories, and performing the above receiving measured biomass inventory values, receiving at least one measured vapor space pressure, determining pressure compensated measured biomass inventory values, receiving measured values of biomass input flow to the batch fermenters and biomass output flow from the at least one beer well, determining a net measured biomass flow, determining the total inventory of batch and continuous inventories, storing the determined total inventory of batch and continuous inventories, and controlling biofuel production rates in the biofuel process, multiple times in an iterative manner to control biofuel production.

Figure 5:
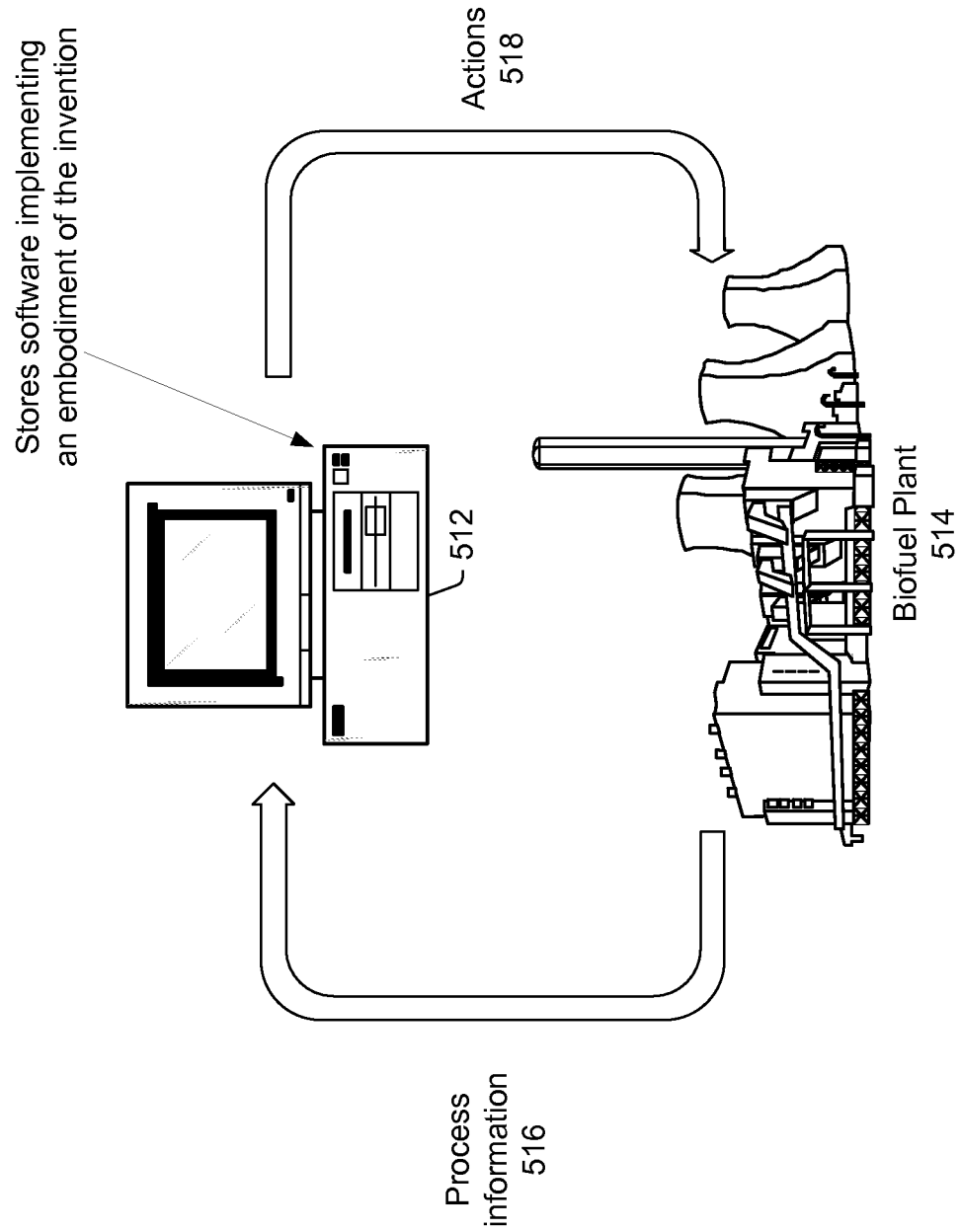
FIG. 5 illustrates model predictive control of a biofuel production process, according to one embodiment.

FIG. 5—Model Predictive Control of a Biofuel Production Process

As noted above, in preferred embodiments, the system may include one or more computing means, e.g., computers, configured to store and execute program instructions implementing embodiments of the present invention. For example, the program instructions may be executable to implement a model predictive controller executable to: receive the determined total inventory of batch and continuous inventories to a model predictive controller as input, and control biofuel production rates based on the determined total inventory to maintain beer well inventory between specified minimum and maximum levels during batch transfer from any of the batch fermenters to the beer well, as discussed above.

FIG. 5 illustrates a simplified view of an automated control system for a biofuel production plant 514. As shown, the system may include one or more computer systems 512 which interact with the biofuel plant 514 being controlled. The computer system 512 may represent any of various types of computer systems or networks of computer systems which execute software program(s) according to various embodiments of the present invention. As indicated, the computer system stores (and executes) software for managing fermentation in the biofuel plant 514. The software program(s) may perform the above described determination of total fermentation biomass inventory, as well as for managing fermentation in the biofuel plant 514, e.g., possibly including various aspects of modeling, prediction, optimization and/or control of the fermentation process. Thus, the control system may implement predictive model control of fermentation and/or other processes or sub-processes in the biofuel plant or process. The system may further provide an environment for making optimal decisions using an optimization solver, i.e., an optimizer, and carrying out those decisions, e.g., to control the plant.

Thus, the system may provide an environment for a scheduling process of programmatically retrieving process information 516 relevant to the processes of the plant, and determining biomass inventory as described above, and generating actions 518, e.g., control actions, to control the fermentation process, e.g., including controlling batch and continuous fermentation inventories of the biofuel plant or process.

The one or more computer systems 512 preferably include a memory medium on which computer programs according to the present invention are stored. In other words, embodiments of the methods described herein may be implemented by software, where the software is stored on a memory medium in or coupled to the system. The term "memory medium" is intended to include various types of memory or storage, including an installation medium, e.g., a CD-ROM, or floppy disks, one or more computer system memories or random access memory such as DRAM, SRAM, EDO RAM, Rambus RAM, etc., or a non-volatile memory such as a magnetic medium, e.g., a hard drive, or optical storage. The memory medium may comprise other types of memory as well, or combinations thereof. In addition, the memory medium may be located in a first computer in which the programs are executed, or may be located in a second different computer which connects to the first computer over a network. In the latter instance, the second computer provides the program instructions to the first computer for execution. The memory medium may include a plurality of memory media, possibly distributed across multiple computer systems.

Also, as noted above the computer system(s) 512 may take various forms, including a personal computer system, mainframe computer system, workstation, embedded controller, network appliance, Internet appliance or other device. In general, the term "computer system" can be broadly defined to encompass any device (or collection of devices) having a processor (or processors) which executes instructions from a memory medium.

The memory medium (which may include a plurality of memory media) preferably stores one or more software programs for performing embodiments of the method described above, and may also implement various aspects of model predictive control and optimization. The software program(s) are preferably implemented using component-based techniques and/or object-oriented techniques. For example, the software program may be implemented using ActiveX controls, C++ objects, Java objects, Microsoft Foundation Classes (MFC), or other technologies or methodologies, as desired. The software programs may also include one or more nonlinear models, e.g., artificial neural networks, support vector machines, etc., as desired. A CPU, such as the host CPU, executing code and data from the memory medium comprises a means for creating and executing the software program according to the methods or flowcharts described below. In some embodiments, the one or more computer systems may implement one or more controllers, as noted above.

It should be noted that as used herein, the terms "maximum", "minimum", and "optimum", may refer respectively to "substantially maximum", "substantially minimum", and "substantially optimum", where "substantially" indicates a value that is within some acceptable tolerance of the theoretical extremum, optimum, or target value. For example, in one embodiment, "substantially" may indicate a value within 10% of the theoretical value. In another embodiment, "substantially" may indicate a value within 5% of the theoretical value. In a further embodiment, "substantially" may indicate a value within 2% of the theoretical value. In yet another embodiment, "substantially" may indicate a value within 1% of the theoretical value. In other words, in all actual cases (non-theoretical), there are physical limitations of the final and intermediate control element, dynamic limitations to the acceptable time frequency for stable control, or fundamental limitations based on currently understood chemical and physical relationships. Within these limitations the control system will generally attempt to achieve optimum operation, i.e., operate at a targeted value or constraint (max or min) as closely as possible.

Virtual Analyzers for the Biofuel Production Process

In some embodiments, the methods described above may be implemented via a virtual online analyzer (VOA). A typical VOA is a computer-implemented process whereby values or parameters of a process that are not readily available via direct measurement may be estimated or calculated for use in lieu of the measured data. In some embodiments of the present invention, the determination of the total fermentation biomass inventory as described above may be performed by a VOA.

Thus, embodiments of the systems and methods described above may operate to determine total fermentation biomass inventory of a biofuel production process from noisy and/or erroneous measurements of batch and continuous inventory, specifically, from batch fermenters and at least one beerwell, which may then be used to operate the biofuel process in a substantially optimal fashion.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A computer-implemented method for determining a total inventory of batch and continuous inventories in a biofuel production process, comprising:
  receiving measured biomass inventory values, comprising a plurality of fermentation batch inventories of a corresponding plurality of batch fermenters and at least one continuous beer well inventory from a corresponding at least one beer well that receives fermented biomass from the plurality of batch fermenters, wherein the measured biomass inventory values are premised on a controlled vapor space pressure of the batch fermenters and the at least one beer well, wherein the vapor space pressure fluctuates in an uncontrolled manner;
  receiving at least one measured vapor space pressure for the batch fermenters and the at least one beer well;
  determining pressure compensated measured biomass inventory values based on the measured biomass inventory values and the at least one measured vapor space pressure;
  receiving measured values of biomass input flow to the batch fermenters and biomass output flow from the at least one beer well over a specified time period, wherein the measured values of biomass input flow and biomass output flow are premised on a constant biomass temperature and density, wherein biomass temperature and density fluctuate in an uncontrolled manner;
  determining a net measured biomass flow over the specified time period based on the measured values of biomass input flow and biomass output flow;
  determining the total inventory of batch and continuous inventories based on the net measured biomass flow and the pressure compensated measured biomass inventory values, wherein the total inventory of batch and continuous inventories comprises a normalized weighted sum of the net measured biomass flow and the pressure compensated measured biomass inventory values;
  storing the determined total inventory of batch and continuous inventories, wherein the total inventory is useable to control biomass inventory in the biofuel production process; and
  manipulating operating variables of equipment of the biofuel production process based at least in part on the determined total inventory of batch and continuous inventories to control biofuel production rates in the biofuel production process.

2. The method of claim 1, further comprising:
  providing the determined total inventory of batch and continuous inventories to a model predictive controller as input; and
  the model predictive controller controlling biofuel production rates based on the determined total inventory to maintain beer well inventory between specified minimum and maximum levels during batch transfer from any of the batch fermenters to the beer well.

3. The method of claim 1, further comprising:
  indicating the determined total inventory of batch and continuous inventories to an operator of the biofuel production process;
  wherein the determined total inventory is useable by the operator to maintain beer well inventory between specified minimum and maximum levels during batch transfer from any of the batch fermenters to the beer well.

4. The method of claim 1, further comprising:
  determining weighting coefficients for the normalized weighted sum of the net measured biomass flow and the pressure compensated measured biomass inventory values, comprising:
    receiving historical values for the measured biomass inventories, the measured vapor space pressure, and the measured biomass input flow and biomass output flow;
    determining subsets of the historical values wherein the vapor space pressure, the biomass temperature, and the biomass density are controlled; and
    performing regression analysis on the determined subsets of the historical values to determine the weighting coefficients.

5. The method of claim 1, further comprising:
  determining weighting coefficients for the normalized weighted sum of the net measured biomass flow and the pressure compensated measured biomass inventory values, comprising:
    determining a calculated total inventory of batch and continuous inventories;
    operating the biofuel production process a plurality of times using a plurality of candidate weighting coefficient values to generate a corresponding plurality of test values of determined total inventory of batch and continuous inventories;
    analyzing the plurality of test values and the calculated total inventory to determine a test value that most closely matches the calculated total inventory, wherein the determined weighting coefficients correspond to the test value.

6. The method of claim 5, wherein said determining a calculated total inventory of batch and continuous inventories comprises:
  determining the calculated total inventory of batch and continuous inventories based on a known biomass transfer rate of a fermenter to the beer well.

7. The method of claim 1, further comprising:
  performing said receiving measured biomass inventory values, said receiving at least one measured vapor space pressure, said determining pressure compensated measured biomass inventory values, said receiving measured values of biomass input flow to the batch fermenters and biomass output flow from the at least one beer well, said determining a net measured biomass flow, said determining the total inventory of batch and continuous inventories, said storing the determined total inventory of batch and continuous inventories, and said controlling biofuel production rates in the biofuel process, multiple times in an iterative manner to control biofuel production.

8. A system for determining a total inventory of batch and continuous inventories in a biofuel production process, comprising:

a plurality of level sensors, comprising:
- a first plurality of level sensors coupled to a respective first plurality of batch fermenters and configured to measure respective fermentation batch inventories of the batch fermenters; and
- at least one level sensor coupled to a respective at least one beer well, and configured to measure beer well inventory;

wherein the plurality of level sensors operate under an assumption of controlled vapor space pressure of the batch fermenters and the at least one beer well, wherein the vapor space pressure fluctuates in an uncontrolled manner;

at least one pressure sensor coupled to the batch fermenters and the at least one beer well and configured to measure vapor space pressure for the batch fermenters and the at least one beer well;

a biomass input flow sensor coupled to the batch fermenters, and configured to measure biomass input flow to the batch fermenters; and at least one output flow sensor coupled to the at least one beer well, and configured to measure biomass output flow from the at least one beer well, wherein the biomass input flow sensor and the at least one biomass output flow sensor operate under an assumption of a constant biomass temperature and density, wherein biomass temperature and density fluctuate in an uncontrolled manner; and at least one processor and memory, coupled to the plurality of level sensors, the at least one pressure sensor, and the biomass input flow and output flow sensors, wherein the memory stores program instructions executable by the at least one processor to:
- receive measured biomass inventory values from the plurality of level sensors;
- receive at least one measured vapor space pressure for the batch fermenters and the at least one beer well from the at least one pressure sensor;
- determine pressure compensated measured biomass inventory values based on the measured biomass inventory values and the at least one measured vapor space pressure;
- determine a net measured biomass flow over a specified time period based on the measured values of biomass input flow and biomass output flow;
- determine the total inventory of batch and continuous inventories based on the net measured biomass flow and the pressure compensated measured biomass inventory values, wherein the total inventory of batch and continuous inventories comprises a normalized weighted sum of the net measured biomass flow and the pressure compensated measured biomass inventory values;
- store the determined total inventory of batch and continuous inventories, wherein the total inventory is useable to control biomass inventory in the biofuel production process; and
- manipulate operating variables of equipment of the biofuel production process based at least in part on the determined total inventory of batch and continuous inventories to control biofuel production rates in the biofuel production process.

9. The system of claim 8, wherein the program instructions are further executable to implement a model predictive controller, wherein the model predictive controller is executable to:
- receive the determined total inventory of batch and continuous inventories to a model predictive controller as input; and
- control biofuel production rates based on the determined total inventory to maintain beer well inventory between specified minimum and maximum levels during batch transfer from any of the batch fermenters to the beer well.

10. The system of claim 8, wherein the program instructions are further executable to:
- indicate the determined total inventory of batch and continuous inventories to an operator of the biofuel production process;
- wherein the determined total inventory is useable by the operator to maintain beer well inventory between specified minimum and maximum levels during batch transfer from any of the batch fermenters to the beer well.

11. The system of claim 8, wherein the program instructions are further executable to:
- determine weighting coefficients for the normalized weighted sum of the net measured biomass flow and the pressure compensated measured biomass inventory values, wherein, to determine the weighting coefficients, the program instructions are executable to:
  - receive historical values for the measured biomass inventories, the measured vapor space pressure, and the measured biomass input flow and biomass output flow;
  - determine subsets of the historical values wherein the vapor space pressure, the biomass temperature, and the biomass density are controlled; and
  - perform regression analysis on the determined subsets of the historical values to determine the weighting coefficients.

12. The system of claim 8, wherein the program instructions are further executable to:
- determine weighting coefficients for the normalized weighted sum of the net measured biomass flow and the pressure compensated measured biomass inventory values, wherein, to determine the weighting coefficients, the program instructions are executable to:
  - determine a calculated total inventory of batch and continuous inventories;
  - operate the biofuel production process a plurality of times using a plurality of candidate weighting coefficient values to generate a corresponding plurality of test values of determined total inventory of batch and continuous inventories;
  - analyze the plurality of test values and the calculated total inventory to determine a test value that most closely matches the calculated total inventory, wherein the determined weighting coefficients correspond to the test value.

13. The system of claim 12, wherein to determine a calculated total inventory of batch and continuous inventories, the program instructions are executable to:
- determine the calculated total inventory of batch and continuous inventories based on a known biomass transfer rate of a fermenter to the beer well.

14. The system of claim 8, wherein the program instructions are further executable to:
- control biofuel production rates in the biofuel production process using the determined total inventory of batch and continuous inventories; and
- perform said receiving measured biomass inventory values, said receiving at least one measured vapor space pressure, said determining pressure compensated measured biomass inventory values, said receiving measured values of biomass input flow to the batch fermenters and biomass output flow from the at least one beer well, said determining a net measured biomass flow, said determining the total inventory of batch and continuous inventories, said storing the determined total inventory of batch and continuous inventories, and said controlling biofuel production rates in the biofuel process, multiple times in an iterative manner to control biofuel production.

15. A computer-accessible non-transitory memory medium that stores program instructions for determining a total inventory of batch and continuous inventories in a biofuel production process, wherein the program instructions are executable by a processor to perform:
    receiving measured biomass inventory values, comprising a plurality of fermentation batch inventories of a corresponding plurality of batch fermenters and at least one continuous beer well inventory from a corresponding at least one beer well that receives fermented biomass from the plurality of batch fermenters, wherein the measured biomass inventory values are premised on a controlled vapor space pressure of the batch fermenters and the at least one beer well, wherein the vapor space pressure fluctuates in an uncontrolled manner;
    receiving at least one measured vapor space pressure for the batch fermenters and the at least one beer well;
    determining pressure compensated measured biomass inventory values based on the measured biomass inventory values and the at least one measured vapor space pressure;
    receiving measured values of biomass input flow to the batch fermenters and biomass output flow from the at least one beer well over a specified time period, wherein the measured values of biomass input flow and biomass output flow are premised on a constant biomass temperature and density, wherein biomass temperature and density fluctuate in an uncontrolled manner;
    determining a net measured biomass flow over the specified time period based on the measured values of biomass input flow and biomass output flow;
    determining the total inventory of batch and continuous inventories based on the net measured biomass flow and the pressure compensated measured biomass inventory values, wherein the total inventory of batch and continuous inventories comprises a normalized weighted sum of the net measured biomass flow and the pressure compensated measured biomass inventory values;
    storing the determined total inventory of batch and continuous inventories, wherein the total inventory is useable to control biomass inventory in the biofuel production process; and
    controlling biofuel production rates in the biofuel production process using the determined total inventory of batch and continuous inventories.

16. The memory medium of claim 15, wherein the program instructions are further executable to perform:
    providing the determined total inventory of batch and continuous inventories to a model predictive controller as input; and
    the model predictive controller controlling biofuel production rates based on the determined total inventory to maintain beer well inventory between specified minimum and maximum levels during batch transfer from any of the batch fermenters to the beer well.

17. The memory medium of claim 15, wherein the program instructions are further executable to perform:
    indicating the determined total inventory of batch and continuous inventories to an operator of the biofuel production process;
    wherein the determined total inventory is useable by the operator to maintain beer well inventory between specified minimum and maximum levels during batch transfer from any of the batch fermenters to the beer well.

18. The memory medium of claim 15, wherein the program instructions are further executable to perform:
    determining weighting coefficients for the normalized weighted sum of the net measured biomass flow and the pressure compensated measured biomass inventory values, comprising:
        receiving historical values for the measured biomass inventories, the measured vapor space pressure, and the measured biomass input flow and biomass output flow;
        determining subsets of the historical values wherein the vapor space pressure, the biomass temperature, and the biomass density are controlled; and
        performing regression analysis on the determined subsets of the historical values to determine the weighting coefficients.

19. The memory medium of claim 15, wherein the program instructions are further executable to perform:
    determining weighting coefficients for the normalized weighted sum of the net measured biomass flow and the pressure compensated measured biomass inventory values, comprising:
        determining a calculated total inventory of batch and continuous inventories;
        operating the biofuel production process a plurality of times using a plurality of candidate weighting coefficient values to generate a corresponding plurality of test values of determined total inventory of batch and continuous inventories; and
        analyzing the plurality of test values and the calculated total inventory to determine a test value that most closely matches the calculated total inventory, wherein the determined weighting coefficients correspond to the test value.

20. The memory medium of claim 19, wherein said determining a calculated total inventory of batch and continuous inventories comprises:
    determining the calculated total inventory of batch and continuous inventories based on a known biomass transfer rate of a fermenter to the beer well.

21. The memory medium of claim 15, wherein the program instructions are further executable to perform:
    performing said receiving measured biomass inventory values, said receiving at least one measured vapor space pressure, said determining pressure compensated measured biomass inventory values, said receiving measured values of biomass input flow to the batch fermenters and biomass output flow from the at least one beer well, said determining a net measured biomass flow, said determining the total inventory of batch and continuous inventories, said storing the determined total inventory of batch and continuous inventories, and said controlling biofuel production rates in the biofuel process, multiple times in an iterative manner to control biofuel production.

22. A computer-implemented method for determining a total inventory of batch and continuous inventories in a biofuel production process, comprising:

measuring biomass inventory values, wherein said measuring is premised on a controlled vapor space pressure, wherein actual vapor space pressure fluctuates in an uncontrolled manner;

measuring at least one measured vapor space pressure;

determining pressure compensated measured biomass inventory values based on the measured biomass inventory values and the at least one measured vapor space pressure;

measuring values of biomass input flow and biomass output flow over a specified time period, wherein said measuring values of biomass input flow and biomass output flow is based on a constant biomass temperature and density, wherein actual biomass temperature and density fluctuate in an uncontrolled manner;

determining the total inventory of batch and continuous inventories based on the pressure compensated measured biomass inventory values and the measured values of biomass input flow and biomass output flow; and manipulating operating variables of equipment of the biofuel production process based at least in part on the determined total inventory of batch and continuous inventories to control biofuel production rates in the biofuel production process.

* * * * *